(12) United States Patent
Bianco et al.

(10) Patent No.: US 10,211,744 B2
(45) Date of Patent: Feb. 19, 2019

(54) SECONDARY SIDE CURRENT MODE CONTROL FOR A CONVERTER

(71) Applicant: STMICROELECTRONICS S.r.l., Agrate Brianza (IT)

(72) Inventors: Alberto Bianco, Gressan (IT); Giuseppe Scappatura, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 82 days.

(21) Appl. No.: 15/595,577

(22) Filed: May 15, 2017

(65) Prior Publication Data

US 2018/0331627 A1    Nov. 15, 2018

(51) Int. Cl.
   *H02M 3/335*    (2006.01)
   *H02M 3/315*    (2006.01)
   *H02M 1/00*     (2006.01)

(52) U.S. Cl.
   CPC ....... *H02M 3/3353* (2013.01); *H02M 3/3155* (2013.01); *H02M 3/33538* (2013.01); *H02M 3/33576* (2013.01); *H02M 2001/0003* (2013.01); *H02M 2001/0025* (2013.01)

(58) Field of Classification Search
   CPC .. H02M 3/325; H02M 3/335; H02M 3/33515; H02M 3/33523; H02M 3/335438
   See application file for complete search history.

(56) References Cited

U.S. PATENT DOCUMENTS

2014/0254215 A1*  9/2014  Brinlee ............ H02M 3/33507
                                                   363/21.15
2015/0229149 A1   8/2015  Fahlenkamp et al.

* cited by examiner

*Primary Examiner* — Adolf Berhane
*Assistant Examiner* — Afework Demisse
(74) *Attorney, Agent, or Firm* — Seed IP Law Group LLP

(57) ABSTRACT

A method and apparatus for secondary side current mode control of a converter are provided. In the method and apparatus, an output voltage of the converter is detected, where the converter has primary and secondary windings that are galvanically isolated in respective primary and secondary sides. A secondary control signal is generated in the secondary side based at least in part on the output voltage and a reference voltage. The secondary control signal is converted to a primary control signal provided in the primary side. The converter is driven in the primary side based at least in part on the primary control signal and a current sense signal indicative of a current flowing through the primary winding.

16 Claims, 5 Drawing Sheets

SECONDARY SIDE CURRENT MODE CONTROL FOR A CONVERTER

BACKGROUND

Technical Field

This application is directed to controlling a converter, and, in particular, controlling a converter having feedback isolation using secondary side current control.

Description of the Related Art

In the field of electric power conversion systems, a flyback converter is a type of buck-boost converter with feedback isolation of a galvanic type. In a converter with galvanic isolation, the output voltage is provided in a different power domain or side than the input voltage. The isolation between the domains presents challenges in feedback control due at least in part to the fact that various parameters required for controlling the converter reside in two isolated power domains.

It is desirable to have feedback control for a converter having power isolation. It is also desirable for the feedback control to be performed in a secondary side of the converter and to be used to drive the converter from the primary side.

BRIEF SUMMARY

A flyback converter may be summarized as including a transformer including a primary winding and a secondary winding that are galvanically isolated in respective primary and secondary sides, the transformer being configured to provide an output voltage; and a feedback stage including a secondary side control stage, in the secondary side, configured to generate a secondary control signal based at least in part on the output voltage and a reference voltage; and an isolation stage configured to generate a primary control signal on the primary side based on the secondary control signal; a power switch in the primary side, the power switch being configured to control current conduction through the primary winding; and a driving stage, in the primary side, configured to generate a driving signal for driving the power switch based at least in part on the primary control signal and a current sense signal indicative of a current through the primary winding; and operate the power switch in accordance with the driving signal. The secondary side control stage may be configured to cause the secondary control signal to transition from a deasserted state to an asserted state to indicate a time when the power switch is to be driven; and retain the secondary control signal in the asserted state for a duration commensurate with a desired current of the primary winding. The driving stage may be configured to detect that the primary control signal transitioned from a deasserted state to an asserted state; and assert the driving signal in response to detecting that the primary control signal transitioned from the deasserted state to the asserted state. The driving stage may be configured to determine a desired current of the primary winding based at least in part on the primary control signal; compare the desired current with the current through the primary winding to determine whether the current through the primary winding reached the desired current; and in response to determining that the current through the primary winding reached the desired current, deassert the driving signal. The driving stage may be configured to determine the desired current based at least in part on an on-time duration of the primary control signal. The on-time duration is in a clock cycle of the primary control signal that is a preceding clock cycle ending when the primary control signal transitioned from the deasserted state to the asserted state.

The isolation stage may include an optocoupler configured to receive the secondary control signal in the secondary side; convert the secondary control signal to the primary control signal; and output the primary control signal in the primary side. The secondary side control stage may be configured to generate a compensated error signal based at least in part on the output voltage and the reference voltage; compare the compensated error signal to a sawtooth signal; and assert the secondary control signal when the compensated error signal exceeds the sawtooth signal and deassert the secondary control signal when the sawtooth signal exceeds the compensated error signal.

The secondary side control stage may be configured to: cause the secondary control signal to transition from an asserted state to a deasserted state to indicate a time when the power switch is to be driven; and retain the secondary control signal in the deasserted state for a duration commensurate with a desired current of the primary winding. The driving stage may be configured to: detect that the primary control signal transitioned from the asserted state to the deasserted state; and assert the driving signal in response to detecting that the primary control signal transitioned from the asserted state to the deasserted state A controller may be summarized as including a secondary side control stage positioned in a secondary domain that is galvanically isolated from a primary domain and configured to detect an output voltage of a converter; generate a secondary control signal, based at least in part on the output voltage and a reference voltage representing a desired output voltage of the converter, by at least transitioning the secondary control signal from at least one of: a deasserted state to an asserted state and the asserted state to the deasserted state to indicate a time when the converter is to be driven; retaining the secondary control signal in at least one of the asserted state and the deasserted state for a duration of time commensurate with a desired current level of the converter; and outputting the secondary control signal for conversion to a primary control signal in the primary domain.

The controller may further include an isolation stage configured to receive the secondary control signal and convert the secondary control signal to the primary control signal by at least detecting that the secondary control signal transitioned from the at least one of the deasserted state to the asserted state and the asserted state to the deasserted state; in response to detecting that the secondary control signal transitioned from the at least one of the deasserted state to the asserted state and the asserted state to the deasserted state, transitioning the primary control signal to at least one of the asserted state and the deasserted state; and retaining the primary control signal in the at least one of the asserted state and the deasserted state for a duration of time commensurate with the duration of time that the secondary control signal remains in the at least one of the asserted state and the deasserted state.

The controller may further include a driving stage, operating in the primary domain, configured to detect that the primary control signal transitioned to the at least one of the asserted state and the deasserted state; and in response to detecting that the primary control signal transitioned to the at least one of the asserted state and the deasserted state, asserting or deasserting a driving signal for operating the converter. The driving stage may be configured to receive a current sense signal indicative of a current level of the converter; detect the desired current level of the converter based at least in part on the primary control signal; determining whether the current level of the converter has reached the desired current level of the converter; in response to determining that the current level of the converter has reached the desired current level of the converter, asserting or deasserting the driving signal. The driving stage may be configured to detect the desired current level of the converter based on at least one of an on-time duration and an off-time duration of the primary control signal. The on-time duration may be in a clock cycle that is a preceding clock cycle ending when the primary control signal transitioned to the asserted state.

A method may be summarized as including detecting an output voltage of a converter having primary and secondary windings that are galvanically isolated in respective primary and secondary sides; generating, in the secondary side, a secondary control signal based at least in part on the output voltage and a reference voltage; converting the secondary control signal to a primary control signal provided in the primary side; and driving, in the primary side, the converter based at least in part on the primary control signal and a current sense signal indicative of a current flowing through the primary winding. Generating the secondary control signal may include causing the secondary control signal to transition from at least one of: a deasserted state to an asserted state and the asserted state to the deasserted state to indicate a time when the converter is to be powered; and retaining the secondary control signal in at least one of the asserted state and the deasserted state for a duration commensurate with a desired current of the primary winding. Generating the secondary control signal may include generating a plurality of control signals, wherein a first control signal of the plurality of control signals indicates the time when the converter is to be powered and a second control signal of the plurality of control signals indicates a desired current of the primary winding. Generating the secondary control signal may include generating a plurality of control signals, wherein a first control signal of the plurality of control signals indicates the time when the converter is to be powered and a second control signal of the plurality of control signals indicates the a desired current of the primary winding.

DETAILED DESCRIPTION

Figure 1:
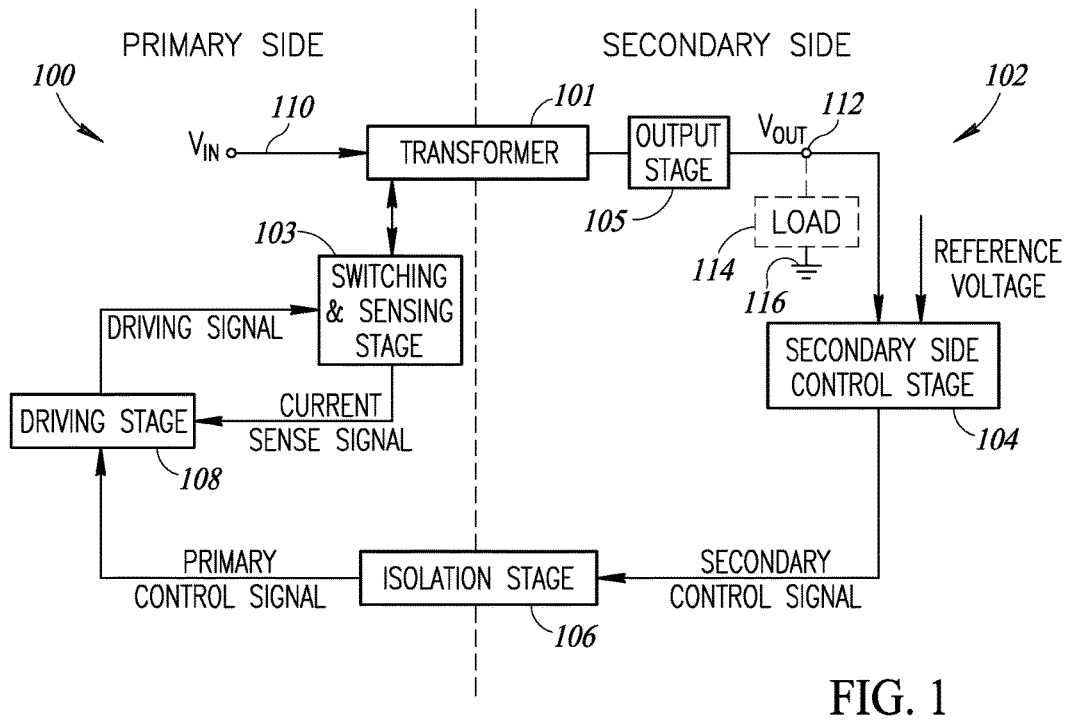
FIG. 1 shows a block diagram of a converter having a feedback control stage.

FIG. 1 shows a block diagram of a converter 100 having a feedback control stage 102. The converter 100 also includes a transformer 101, a switching and sensing stage 103 and an output stage 105. The feedback control stage 102 includes a secondary side control stage 104, an isolation stage 106 and a driving stage 108. The converter 100 receives, at an input voltage node 110, an input voltage ($V_{IN}$) and outputs, at an output voltage node 112, an output voltage ($V_{OUT}$).

The transformer 101 is coupled to the switching and sensing stage 103 and the output stage 105. The switching and sensing stage 103 also receives, at an input, a driving signal and outputs, at an output, a current sense signal. The output stage 105 provides the output voltage ($V_{OUT}$) to a load 114 coupled between the output voltage node 112 and a ground node 116.

The secondary side control stage 104 receives, at an input, the output voltage. The secondary side control stage 104 also receives a reference voltage. The secondary side control stage 104 outputs, at an output, a secondary control signal. The isolation stage 106 receives, at an input, the secondary control signal and provides, at an output, a primary control signal. The driving stage 108 receives the primary control signal and the current sense signal from the switching and sensing stage 103 and outputs the driving signal to the switching and sensing stage 103.

The converter 100 may be any type of converter, such as a flyback converter or an active clamp flyback converter. The converter 100 may be a half bridge, forward, full bridge, or resonant flyback converter. The converter 100 may have isolated primary and secondary sides or domains. The primary and secondary sides may be galvanically isolated, for example, by the transformer 101 of the converter 100. The primary side may operate in accordance with a power domain of the input voltage and the secondary side may operate in accordance with a power domain of the output voltage.

The converter 100 may receive the input voltage and operate on the input voltage to produce the output voltage for driving the load 114. The converter 100 may increase or decrease the output voltage in relation to the input voltage and may, accordingly, be in a boost or a buck converter family, respectively. The output voltage may be used to drive the load 114.

The secondary side control stage 104 receives the output voltage and the reference voltage. The reference voltage represents a desired or sought output voltage level of the converter 100. The secondary side control stage 104 determines a compensated error voltage that represents a difference between the reference voltage and the output voltage. The secondary side control stage 104 uses the compensated error voltage to determine a timing of the operation of the converter 100. The secondary side control stage 104 may determine the timing of switching the converter 100 and a desired current level of the converter 100. The secondary control signal output by the secondary side control stage 104 represents control parameters for controlling the converter 100.

The control parameters may include a time when the converter 100 is to be provided with an input voltage and a desired current level of a primary winding of the converter 100 as described herein. It is noted that the primary and secondary control signals may each be a plurality of control signals that carry parameters for controlling the converter 100 as described herein.

The isolation stage 106, which may include an optocoupler, among others, is configured to generate the primary control signal based on the secondary control signal. The isolation stage 106 channels or tunnels the secondary control signal into the primary side without breaching a boundary (for example, a power domain isolation boundary) between the primary and secondary sides. It is desirable for the isolation stage 106 to timely translate the secondary control signal into the primary control signal. For example, it is desirable for a lag between the primary and secondary control signals to be at a minimum.

The driving stage 108 receives the primary control signal from the isolation stage 106 and the current sense signal. The driving stage 108 generates a driving signal based on the current sense signal and the primary control signal. The driving stage 108 outputs the driving signal to the switching and sensing stage 103. The driving signal dictates the timing operation of the converter 100 as described herein.

The converter 100 is said to be controlled by secondary side control because the secondary side control stage 104 (operating in the secondary side and its power domain) determines the control parameters for the converter 100 (for example, a switching timing and a desired current level of the converter 100). The driving stage 108, which is in the primary side and under the primary side power domain, enforces the control parameters and operates the converter 100 in accordance with the control parameters.

Secondary side control is desirable due to the fact that the output voltage of the converter 100 is provided at the secondary side. The output voltage may be used for controlling the converter 100 by the secondary side control stage 104 without crossing power domains.

Furthermore, in some applications, such as Universal Serial Bus (USB) power delivery (PD) applications, the secondary side of the converter is pre-equipped with a controller. The controller is used to provide information about the load 114 and fault detection to external elements, among others. Secondary side control may be performed by such a controller without the need for additional circuitry and while maintaining the same circuit footprint. Accordingly, secondary side control may repurpose or use existing control capability without adding additional hardware. It is noted that in various embodiments the secondary side control stage 104 may be implemented by a controller, a microcontroller or a processor. Similarly, the driving stage 108 may also be implemented by a controller, a microcontroller or a processor.

Figure 2:
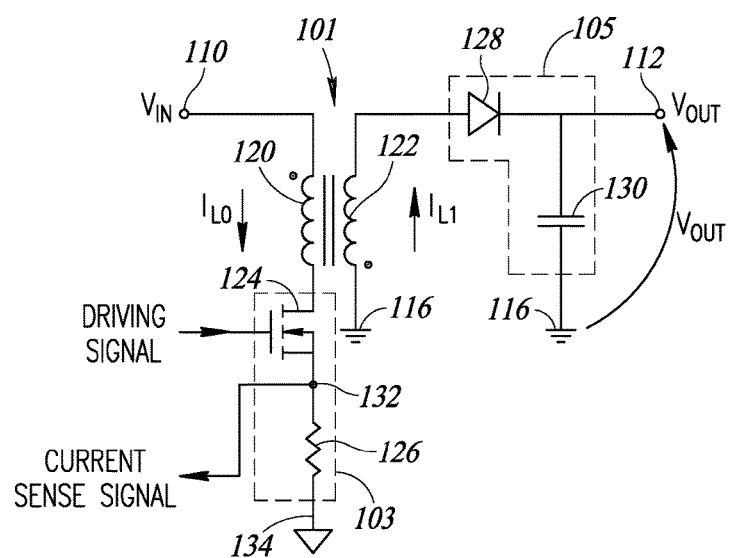
FIG. 2 shows a schematic of the converter in accordance with an embodiment.

FIG. 2 shows a schematic of the transformer 101, switching and sensing stage 103 and output stage 105 in accordance with an embodiment. The transformer 101 includes a primary winding 120 and a secondary winding 122. The switching and sensing stage 103 includes a power transistor 124 and a sense resistance 126. The output stage 105 includes a diode 128 and an output capacitance 130. The primary winding 120 has a first terminal coupled to the input voltage node 110 and a second terminal coupled to a drain of the power transistor 124. A source of the power transistor 124 is coupled to a current sense node 132. A gate of the power transistor 124 is driven by the driving signal described herein.

The current sense node 132 is coupled to a first terminal of the sense resistance 126. A second terminal of the sense resistance 126 is coupled to a ground node 134, which may be a virtual ground. The current sense node 132 is tapped for providing the current sense signal.

A first terminal of the secondary winding 122 is coupled to the ground node 116. A second terminal of the secondary winding 122 is coupled to an anode of the diode 128. A cathode of the diode 128 is coupled to the output voltage node 112. The output capacitance 130 is coupled between the output voltage node 112 and the ground node 116.

The transformer 101 receives the input voltage ($V_{IN}$) at the input voltage node 110. The input voltage may be a direct current (DC) voltage. The input voltage may be the output of a rectifier (not shown), whereby the rectifier may be used to convert an alternating current (AC) voltage to the DC voltage provided as the input voltage.

The driving signal controls the operation of the transformer 101. The driving signal switches the power transistor 124 on and off. When the power transistor 124 is switched on (i.e., in the electrically conductive state) and an input voltage is applied to the input voltage node 110, current ($I_{L0}$) will flow through the primary winding 120 of the transformer 101. When the power transistor 124 is off (i.e., in the electrically non-conductive state), current will cease flowing through the primary winding 120. The flow of current through the primary winding 120 during the on-time affects the flow of current ($I_{L1}$) through the secondary winding 122 during the off-time and, consequently, the output voltage taken at the output voltage node 112. Generally, the longer the power transistor 124 is switched on, the higher will be the output voltage depending on the load 114. The timing of switching on power transistor 124 and the duration of time that the power transistor 124 is switched on dictates the output voltage.

The current sense signal, which is taken as a voltage at the current sense node 132, represents the current ($I_{L0}$) flowing through the primary winding 120 of the transformer 101.

In general, the driving signal is a pulse width modulation (PWM) signal that alternates between an on state and an off state. A duty cycle of the driving signal represents a ratio between the duration of time that the driving signal is on (an on-time of the driving signal) to the total duration of time that the driving signal is on and off (both the on-time and off-time of the driving signal).

It is noted that although the driving signal as well as other signals are described herein by convention as being on, asserted or activated when they are set to a logical one or high rail voltage, and are described herein as being off, deasserted or deactivated when they are set to a logical zero or a low rail voltage or ground, this convention may be reversed without departing from the teachings of the embodiments described herein. In an alternative convention, activating, asserting or turning on a signal may indicate setting the signal to a ground voltage or a logical zero, whereas deactivating, deasserting or turning off a signal may indicate setting the signal to a high rail voltage (such as, $V_{CC}$) or a logical one.

It is also noted that although a flyback converter is shown in FIG. 2, an active clamp flyback converter or a resonant flyback converter may instead be used without departing from the teachings of the embodiments described herein.

Figure 3:
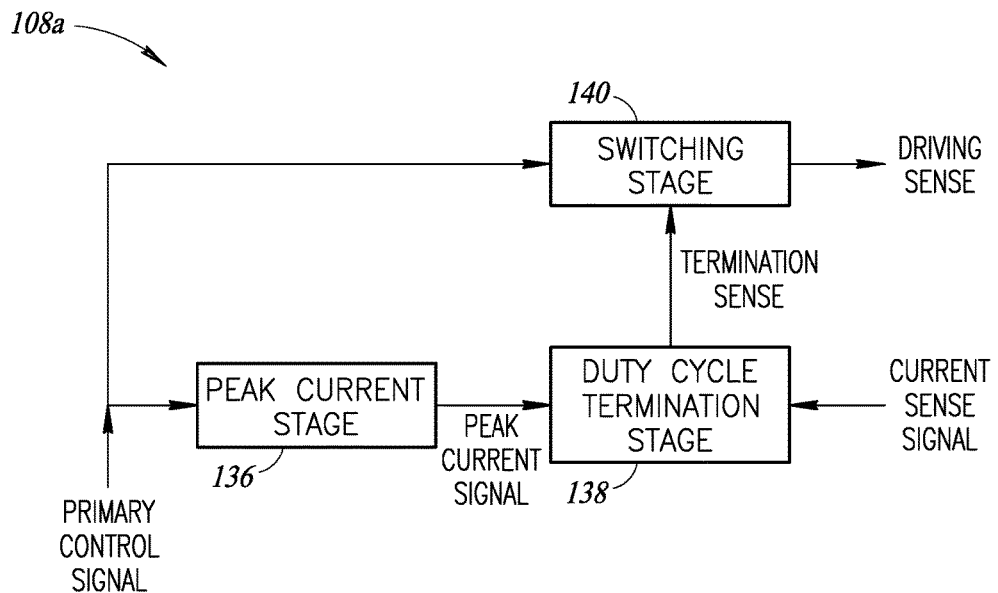
FIG. 3 shows a block diagram of a driving stage for driving the converter in accordance with an embodiment.

FIG. 3 shows a block diagram of a driving stage 108a in accordance with an embodiment. The driving stage 108a includes a peak current stage 136, a duty cycle termination stage 138 and a switching stage 140. The peak current stage 136 receives the primary control signal and determines, based on the primary control signal, a desired current level of the primary winding 120 of the converter 100. The desired current level may be a peak current of the primary side of the converter 100. An on-time duration of the primary control signal may be used to represent the desired current level. In an embodiment, the peak current stage 136 may include a filter, such as a resistance-capacitance (RC) filter. The filter may be used to determine the desired current level based on the duty cycle of the primary control signal. The peak current stage 136 outputs a peak current signal representative of the desired current level.

The duty cycle termination stage 138 receives the peak current signal from the peak current stage 136 and the current sense signal from the switching and sensing stage 103. The duty cycle termination stage 138 compares the desired current level to the sensed current level. The duty cycle termination stage 138 generates a termination signal based on the comparison. The duty cycle termination stage 138 outputs the termination signal to the switching stage 140. The termination signal indicates a timing of a termination of the driving signal so that the current ($I_{LO}$) flowing through the primary winding 120 does not exceed the desired current level indicated by the primary control signal.

The switching stage 140 receives the primary control signal from the isolation stage 106 and receives the termination signal from the duty cycle termination stage 138. The primary control signal indicates a time when the driving signal is to be activated. The switching stage 140 activates the driving signal to power the converter 100 in accordance with the time indicated by the primary control signal.

Referring back to FIG. 2, activating the driving signal switches on the power transistor 124. Switching on the power transistor 124 causes the current ($I_{LO}$) flowing through the primary winding 120 of the transformer 101 to increase.

When the current reaches the desired current level indicated by the primary control signal, the switching stage 140 deactivates the driving signal. To do so, the switching stage 140 deactivates the driving signal when the termination signal is activated. Accordingly, the driving stage 108a switches on the power transistor 124 when the primary control signal indicates that the power transistor 124 is to be switched on. The driving stage 108a switches off the power transistor 124 when the sensed current of the primary winding 120 reaches the desired current.

Because the on-time of the driving signal is dictated by the current level of the primary winding 120, the converter 100 may be said to be controlled by current mode control.

Figure 4:
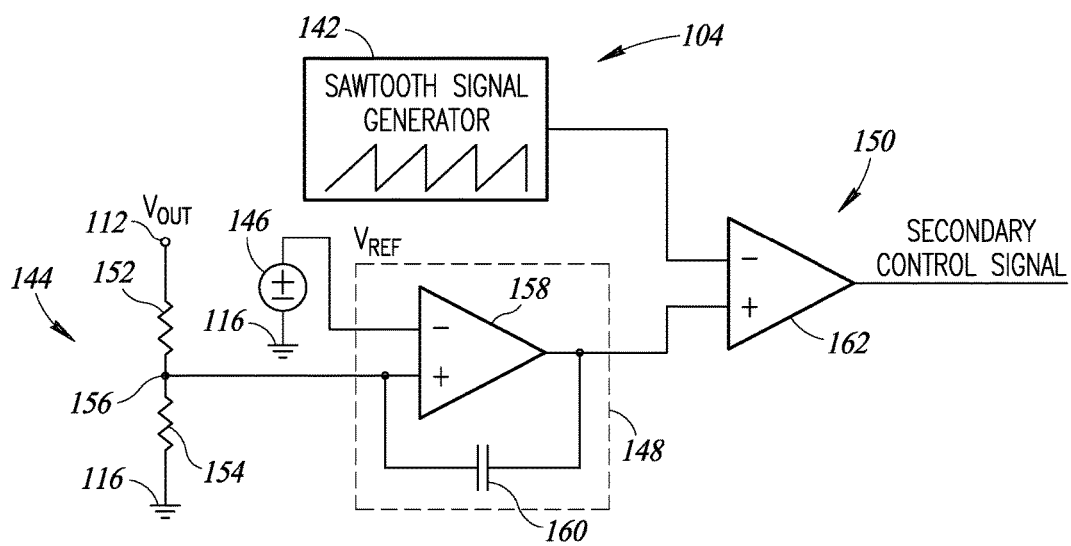
FIG. 4 shows a schematic of the secondary side control stage in accordance with an embodiment.

FIG. 4 shows a schematic of the secondary side control stage 104 in accordance with an embodiment. The secondary side control stage 104 includes a sawtooth signal generator 142, a voltage divider 144, a reference voltage generator 146, an error amplifier 148 and a comparator 150.

The sawtooth signal generator 142 has an output that is coupled to a first input of the comparator 150. A second input of the comparator 150 is coupled to an output of the error amplifier 148. The error amplifier 148 has two inputs; a first input coupled to an output of the reference voltage generator 146 and a second input coupled to an output of the voltage divider 144. The voltage divider 144 has an input coupled to the output voltage node 112 of the converter 100.

The voltage divider 144 detects the output voltage ($V_{OUT}$) and scales the output voltage. The voltage divider 144 outputs the scaled output voltage to the first comparator 148. The reference voltage generator 146 generates a reference voltage ($V_{REF}$). The error amplifier 148 receives the scaled output voltage and the reference voltage and outputs the compensated error signal (voltage). The compensated error signal output by the error amplifier 148 depends on the scaled output voltage, the reference voltage and loop compensation resulting from the capacitance 160 described herein. The error amplifier 148 outputs the compensated error signal to the comparator 150.

The sawtooth signal generator 142 generates a sawtooth signal and outputs the sawtooth signal to the comparator 150. The comparator 150 receives the compensated error signal and the sawtooth signal. The comparator 150 generates the secondary control signal based on the compensated error signal and the sawtooth signal. The comparator 150 asserts or activates the secondary control signal when the compensated error signal exceeds the sawtooth signal. Conversely, the comparator deasserts or deactivates the secondary control signal when the sawtooth signal exceeds the compensated error signal. The secondary control signal may, accordingly, be a PWM signal whose activation indicates a time when the converter 100 should be driven (i.e., when the power transistor 124 of the converter 100 should be turned on).

In alternative embodiments, the secondary control signal may be a PWM signal whose deactivation indicates a time when the converter 100 should be driven. The secondary control signal's off-time duration is then commensurate with a desired current of the primary winding.

It is noted that, although the voltage divider 144 is used to scale the output voltage, the voltage divider 144 and scaling the output voltage may be dispensed with. However, that may come at the expense of increasing a voltage level of the reference voltage generator 146, which, consequently, increases the power consumption of the secondary side control stage 104.

In FIG. 4, the voltage divider 144 is shown to include a first resistance 152 and a second resistance 154 connected in series with an intermediary node 156 therebetween. In particular, a first terminal of the first resistance 152 is coupled to the output voltage node 112 and a second terminal of the first resistance 152 is coupled to the intermediary node 156. A first terminal of the second resistance 154 is coupled to the intermediary node 156, whereas a second terminal of the second resistance 154 is coupled to the ground node 116. The error amplifier 148 is shown to include a first amplifier 158 and the capacitance 160. The comparator 150 is shown to include a second amplifier 162. However, in alternative embodiments, other forms of the voltage divider 144, error amplifier 148 and comparator 150 may be used.

In FIG. 4, the intermediary node 156 is coupled to a non-inverting input of the first amplifier 158. An inverting input of the first amplifier 158 is coupled to a cathode of the reference voltage generator 146. An anode of the reference voltage generator 146 is coupled to the ground node 116. The capacitance 160 of the error amplifier 148 is coupled between the non-inverting input and an output of the first amplifier 158. Further, the output of the sawtooth signal generator 142 is coupled to an inverting input of the second amplifier 162, and the output of the first amplifier 158 is coupled to the non-inverting input of the second amplifier 162. An output of the second amplifier 162 provides the secondary control signal.

Figure 5:
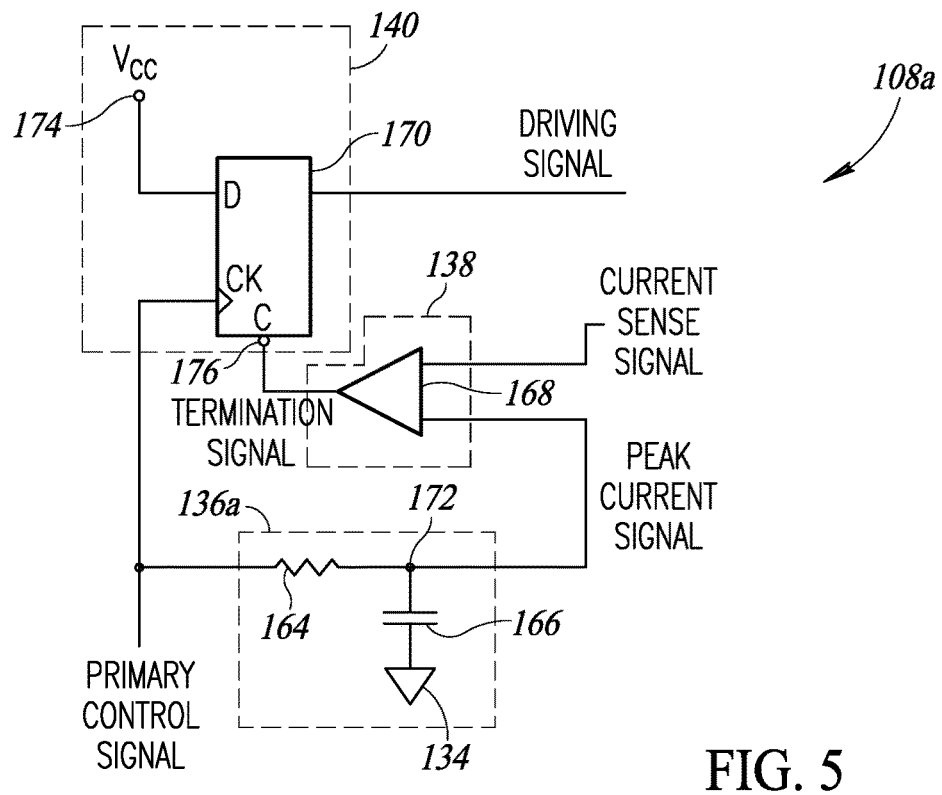
FIG. 5 shows a schematic of a driving stage in accordance with an embodiment.

FIG. 5 shows a schematic of a driving stage 108a in accordance with an embodiment. As described herein, the driving stage 108a includes the peak current stage 136a, the duty cycle termination stage 138 and the switching stage 140. The peak current stage 136a includes a resistance 164 and a first capacitance 166. The duty cycle termination stage 138 includes a comparator 168. The switching stage 140 includes a latch 170 shown as a D flip-flop.

The first capacitance 166 has a first terminal coupled to the ground node 134 and a second terminal coupled to an intermediary node 172. The resistance 164 has a first terminal coupled to the intermediary node 172 and a second terminal for receiving the primary control signal. The second terminal may be coupled to an output of the isolation stage 106 described with reference to FIG. 1 herein. The resistance 164 and first capacitance 166 form an RC filter. Because the on-time duration of the primary control signal is indicative of the desired peak current of the primary winding 120, the RC filter is operative to convert the on-time duration to a voltage signal whose voltage level is indicative of the on-time duration.

The comparator 168 receives the peak current signal at the first input and the current sense signal at a second input. The comparator 168 provides, at its output, the termination signal. The termination signal is deasserted when the current sense signal (or voltage thereof) exceeds the peak current signal. Conversely, the termination signal is asserted when the current sense signal is below the peak current signal.

The latch 170 has a data terminal coupled to a supply voltage node 174, a clock terminal for receiving the primary control signal, a reset terminal coupled to the output of the comparator 168 via an intervening inverter 176, and an output terminal for providing the driving signal. It is noted that although not shown the latch 170 may also have a complementary output terminal.

The supply voltage node 174 provides a supply voltage ($V_{CC}$) to the data terminal of the latch 170. When the primary control signal transitions from the deasserted state to the asserted state, the latch 170 sets a voltage level of the driving signal to the supply voltage provided at the data terminal. Because the data terminal is supplied with a voltage supply level, the driving signal is asserted in response to assertion of the primary control signal. As such, the converter 100 is driven at a time when the primary control signal is asserted. Driving the converter 100 results in increasing the current through the primary winding 120. When the current through the primary winding indicated by the current sense signal reaches the desired peak current indicated by the peak current signal, the termination signal is the deasserted. The termination signal, when deasserted and inverted by the converter 176, resets the latch 170, and as a result the driving signal is deasserted. The driving signal remains in the deasserted state until the primary control signal transitions again to the asserted state.

Accordingly, operation of the driving stage 108a ensures that the driving signal is asserted in response to asserting the primary control signal. Furthermore, the driving signal is deasserted when it is determined that the current through the primary winding 120 has reached a desired current level. The converter 100 is controlled in current mode. Assertion of the primary control signal triggers assertion of the driving signal to drive the converter 100. The driving signal is deasserted when the current of the primary winding 120 reaches the desired current. As a result, the power transistor 124 of the converter is switched off.

It is noted that in alternative embodiment, the use of the primary control signal may be reversed. For example, dessertion rather than assertion of the primary control signal may be used to trigger assertion of the driving signal to drive the converter 100. Further, the driving signal may remain in the asserted state while the primary control signal is deasserted. The driving signal may transition to the deasserted state when the primary control signal is asserted. As such, a reference current level of the transformer 101 winding is dependent on an off-time rather than an on-time of the primary control signal.

Assertion or deassertion of the primary control signal (or the secondary control signal) may be used to trigger assertion of the driving signal to drive the converter 100. Further, in either case, either the on-time duration or the off-time duration of the primary control signal (or the secondary control signal) may be used to represent the reference current level of the transformer 101 winding.

The on-time duration or the off-time duration may be before or after assertion or deassertion of the primary control signal. For example, deassertion of the primary control signal may be used to trigger the driving signal, and the on-time duration preceding the deassertion (or the transitioning from the on-state to the off-state) may be used to represent the current level.

In addition, assertion of the primary control signal may be used to trigger the driving signal, and the off-time duration preceding the assertion (or the transitioning from the off-state to the on-state) may be used to represent the current level.

It is desirable to minimize the occurrence of ripples in the peak current control signal. The ripples may be minimized by holding the output of the peak current stage 136 steady (or to a constant value) during the on-time duration of the driving signal.

Figure 6:
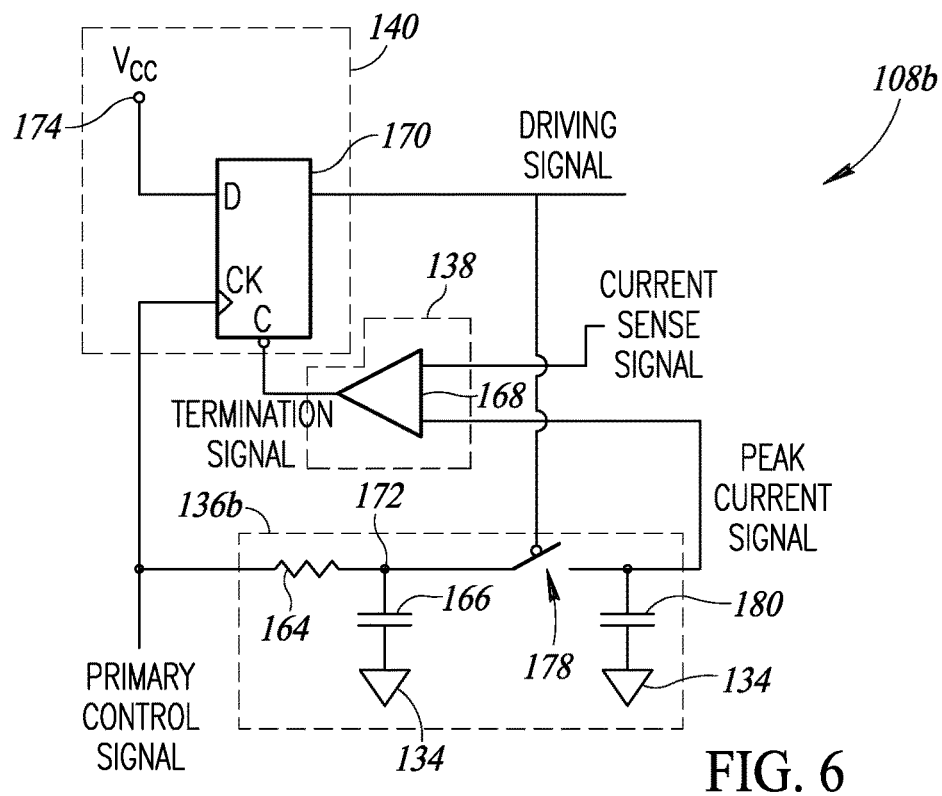
FIG. 6 shows a schematic of a driving stage in accordance with an embodiment.

FIG. 6 shows a schematic of a driving stage 108b in accordance with an embodiment. Similar elements of the driving stage 108b as those of the driving stage 108a described with reference to FIG. 5 have the same reference numerals. The driving stage 108a includes a peak current stage 136b, the duty cycle termination stage 138 and the switching stage 140. In addition to the resistance 164 and the first capacitance 166, the peak current stage 136b further includes an inverted control switch 178 and a second capacitance 180.

The switch 178 has a first conductive terminal coupled to the intermediary node 172. The switch 178 has a second conductive terminal coupled to an input of the duty cycle termination stage 138 (for providing the peak current signal). The switch 178 has an inverted control terminal coupled to the output of the switching stage 140 for receiving the driving signal. The second capacitance 180 is coupled between the input of the duty cycle termination stage 138 and the ground node 134.

When the driving signal is activated, the switch 178 transitions from the closed state (i.e., electrically conductive state) to the open state (i.e., electrically non-conductive state). The switch 178 remains in the open state for the on-time duration of the driving signal. While the driving signal is activated, the peak current signal has a voltage level that is provided by the second capacitance 180. Accordingly, a voltage level of the peak current signal remains steady for the on-time duration of the driving signal.

Because the switch 178 is opened when the driving signal is activated, the voltage level of the peak current signal may lag by one cycle behind that specified by the primary control signal. That is, the peak current signal may reflect the voltage level of a prior switching cycle.

Figure 7:
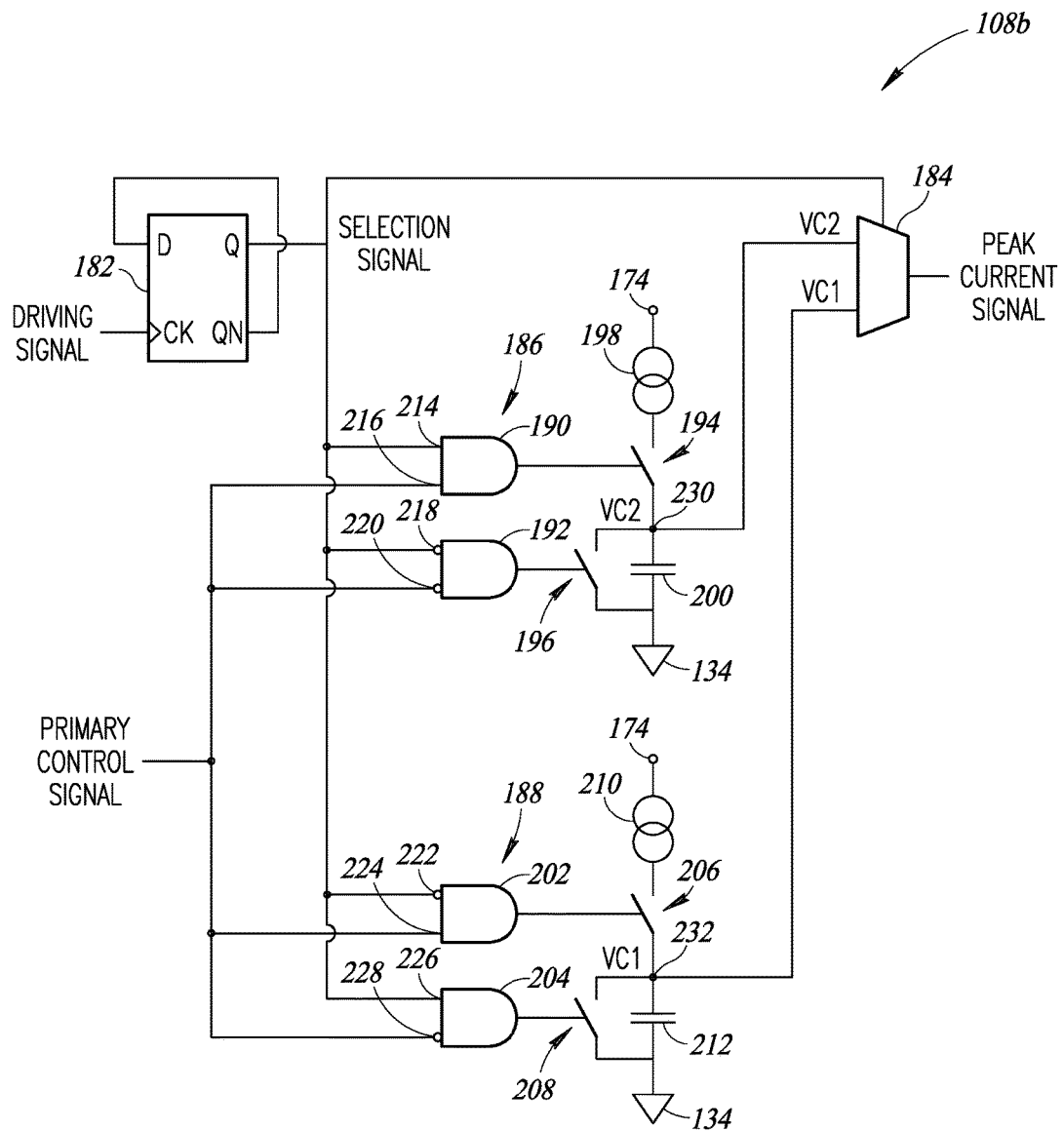
FIG. 7 shows a schematic of a peak current stage in accordance with an embodiment.

FIG. 7 shows a schematic of a peak current stage 136c in accordance with an embodiment. The peak current stage 136c includes a selection latch 182, a multiplexer 184, a first ping-pong stage 186 and a second ping-pong stage 188.

The selection latch 182 has a clock terminal, a data terminal, an output terminal and a complementary output terminal. The multiplexer 184 has first and second input terminals and a selection terminal.

The first ping-pong stage 186 includes a first AND gate 190, a second AND gate 192, a first switch 194, a second switch 196, a current source 198 and a capacitance 200. The second ping-pong stage 188 includes a first AND gate 202, a second AND gate 204, a first switch 206, a second switch 208, a current source 210 and a capacitance 212.

The first AND gate 190 of the first ping-pong stage 186 has a first input terminal 214 and a second input terminal 216 that are both non-inverting. The second AND gate 192 of the first ping-pong stage 186 has a first input terminal 218 and a second input terminal 220 that are both inverting.

The first AND gate 202 of the second ping-pong stage 188 has a first input terminal 222 that is inverting and a second input terminal 224 that is non-inverting. The second AND gate 204 of the second ping-pong stage 188 has a first input terminal 226 that is non-inverting and a second input terminal 228 that is inverting.

In the first ping-pong stage 186, the first input terminals 214, 218 are coupled to the output of the selection latch 182. The second input terminals 216, 220 are coupled to an output of the isolation stage 106. An output of the first AND gate 190 is coupled to a control terminal of the first switch 194. An output of the second AND gate 192 is coupled to a control terminal of the second switch 196. The second switch 196 has conductive terminals coupled between the ground node 134 and an output voltage node 230 of the first ping-pong stage 186. The capacitance 200 is also coupled between the ground node 134 and the output voltage node 230. The first switch 194 has conductive terminals coupled between the output voltage node 230 and a cathode of the current source 198. The current source 198 has an anode coupled to the supply voltage node 174.

In the second ping-pong stage 188, the first input terminals 222, 226 of the AND gates 202, 204 are coupled to the output of the selection latch 182. The second input terminals 224, 228 of the AND gates 202, 204 are coupled to the output of the isolation stage 106. An output of the first AND gate 202 is coupled to a control terminal of the first switch 206. An output of the second AND gate 204 is coupled to a control terminal of the second switch 208. The second switch 208 has conductive terminals coupled between the ground node 134 and an output voltage node 232. The capacitance 212 is also coupled between the ground node 134 and the output voltage node 232. The first switch 206 has conductive terminals coupled between the output voltage node 232 and a cathode of the current source 210. The current source 210 has an anode coupled to the supply voltage node 174.

The first input terminal of the multiplexer 184 is coupled to the output voltage node 230 of the first ping-pong stage 186 and the second input terminal of the multiplexer 184 is coupled to the output voltage node 232 of the second ping-pong stage 188. The selection terminal of the multiplexer 184 is coupled to the output of the selection latch 182. The data terminal of the selection latch 182 is coupled to the latch's 182 complementary output terminal.

The selection latch 182 receives, at its clock terminal, the driving signal supplied by the switching stage 140. The selection latch 182 generates and outputs the selection signal based on the driving signal. At each rising edge of the driving signal the selection signal changes states (i.e., from the asserted state to the deasserted state or from the deasserted state to the asserted state). Accordingly, the selection signal alternates between states for each clock cycle of the driving signal. For one clock cycle of the driving signal, the selection signal will have one state and for an immediately subsequent clock cycle the selection signal will change to another opposite state.

The selection signal is provided to the first and second ping-pong stages 186, 188. The ping-pong stages 186, 188 alternate between either supplying the peak current signal to the multiplexer 184 or being charged to detect a desired peak current level (as indicated by the primary control signal).

When the selection signal is asserted, the first ping-pong stage 186 is charged and the second ping-pong stage 188 supplies the peak current signal. When the selection signal is asserted and the primary control signal is asserted (during the on-time of the primary control signal), the first switch 194 of the first ping-pong stage 186 is closed and the second switch 196 is open. That causes the capacitance 200 to charge using the current source 198. In the meantime, both switches 206, 208 of the second ping-pong stage 188 are opened, thus the voltage level stored by the capacitance 212 is provided as the peak current signal.

The selection signal remains asserted for the entire clock duration of the driving signal. However, the primary control signal becomes deasserted in the clock duration of the driving signal (assuming that the duty cycle of the primary control signal is less than 100%). When the primary control signal is deasserted, the first and second switches 194, 196 of the first ping-pong stage 186 are open. Consequently, the charging of the capacitance 200 ceases. That is, the capacitance 200 is charged in accordance with the on-time duration of the primary control signal and a voltage level of the capacitance 200 reflects the on-time duration of the primary control signal. At the same time, when the selection signal is asserted and the primary control signal is deasserted, the first switch 206 of the second ping-pong stage 188 remains open, while the second switch 208 transitions to the closed state. Consequently, the capacitance 212 is shorted and discharged. The capacitance 212 is recharged in a subsequent cycle of the driving signal.

The selection signal selects the output of the multiplexer 184. When the selection signal is asserted, the multiplexer 184 selects the signal provided by the second ping-pong stage 188 as the output peak current control signal. In the following clock cycle of the driving signal, the selection latch 182 sets the selection signal to the deasserted state. Deassertion of the selection signal causes the multiplexer 184 to output the voltage level provided by the first ping-pong stage 186 as the peak current signal.

When the selection signal is deasserted and the primary control signal is asserted during the primary control signal's on-time duration, both switches 194, 196 of the first ping-pong stage 186 are open. Accordingly, the first ping-pong stage 186 outputs the voltage level stored in the capacitance 200 to the multiplexer 184. The capacitance 200 has been charged during the on-time of the preceding cycle of the primary control signal. The charge of the capacitance 200 is indicative of the previous cycle's on-time duration of the primary control signal.

In the second ping-pong stage 188, the first switch 206 is closed and the second switch 208 is open. Accordingly, the capacitance 212 is charged by the current source 210. The charge of the capacitance 212 represents the on-time duration of the primary control signal.

When the primary control signal transitions to the deasserted state, the second switch 196 of the first ping-pong stage 186 is closed. As a result, the capacitance 200 is discharged for subsequent charging. In the second ping-pong stage 188, the first switch 206 transitions to the open state. As a result, the capacitance 212 ceases receiving a new charge. The capacitance 212 has stored thereon a charge commensurate with the on-time duration of the primary control signal. The second switch 208 remains open so that the charge of the capacitance 212 may be used in the subsequent cycle.

The peak current stage 136c operates to detect an on-time duration of the primary control signal and store a signal (or a voltage level) representative of the on-time duration. The peak current stage 136c then supplies the stored signal as the peak current control signal for a subsequent cycle. The peak current control stage 136c is associated with a lag of one cycle. The peak current control signal supplied during a given cycle represents peak current indicated by the primary control signal in a previous cycle.

Figure 8:
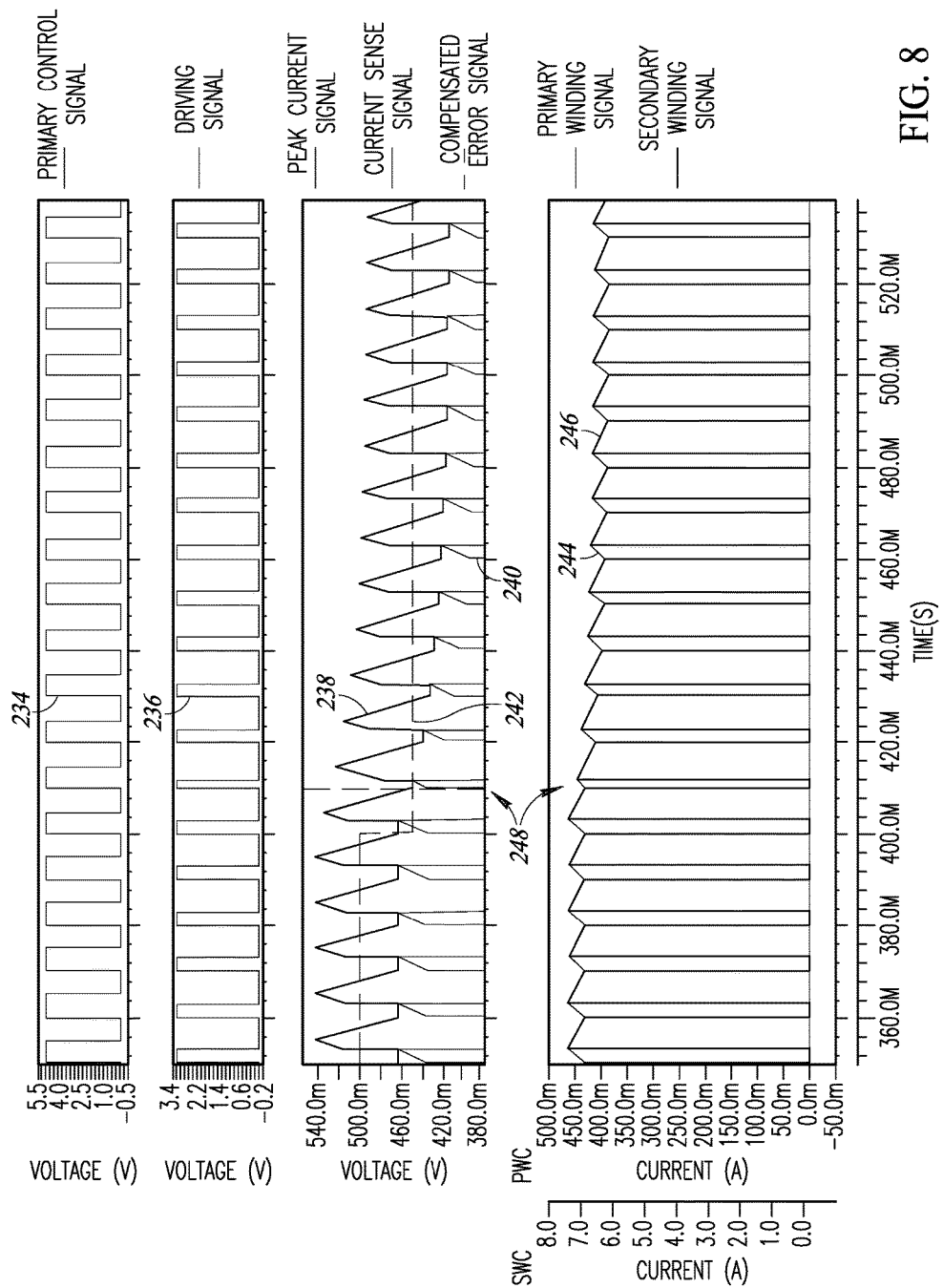
FIG. 8 shows signal diagrams of the converter and the feedback control stage.

FIG. 8 shows signal diagrams of the converter 100. The signal diagrams include the primary control signal 234, the driving signal 236, the peak current signal 238, the current sense signal 240, the compensated error signal 242, the primary winding current signal 244 and the secondary winding current signal 246.

In response to asserting the primary control signal 234, the driving stage 108 responds by asserting the driving signal 236. The driving stage 108 deasserts the driving signal 236 when the voltage level of the current sense signal 240 reaches a voltage level of the peak current signal 238. The compensated error signal 242 depends on an error between the output voltage and the reference voltage as well as compensation performed by the regulator. When the reference voltage reaches the output voltage, the primary winding current (indicated by the current sense signal 240 and the primary winding current signal 244) is generally reduced. The reduction in the voltage level of the current sense signal 240 and the primary winding current signal 244 can be seen after a first time instance 248. The reduction over time in the primary winding current signal 244 induces a reduction in the secondary winding current signal 246.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flyback converter, comprising:
   a transformer including a primary winding and a secondary winding that are galvanically isolated in respective primary and secondary sides, the transformer being configured to provide an output voltage; and
   a feedback stage including:
      a secondary side control stage, in the secondary side, configured to generate a secondary control signal based at least in part on the output voltage and a reference voltage; and
      an isolation stage configured to generate a primary control signal on the primary side based on the secondary control signal;
   a power switch in the primary side, the power switch being configured to control current conduction through the primary winding; and
   a driving stage, in the primary side, configured to:
      generate a driving signal for driving the power switch based at least in part on the primary control signal and a current sense signal indicative of a current through the primary winding; and
      operate the power switch in accordance with the driving signal,
   wherein the secondary side control stage is configured to:
      cause the secondary control signal to transition from a first state to a second state to indicate a time when the power switch is to be driven; and
      retain the secondary control signal in the second state for a duration commensurate with a desired current of the primary winding.

2. The flyback converter of claim 1, wherein the driving stage is configured to:

detect that the primary control signal transitioned from the first state to the second state; and
assert the driving signal in response to detecting that the primary control signal transitioned from the first state to the second state.

3. The flyback converter of claim 2, wherein the driving stage is configured to:
   determine the desired current of the primary winding based at least in part on the primary control signal;
   compare the desired current with the current through the primary winding to determine whether the current through the primary winding reached the desired current; and
   in response to determining that the current through the primary winding reached the desired current, cause the driving signal to transition to the first state.

4. The flyback converter of claim 3, wherein the driving stage is configured to determine the desired current based at least in part on an on-time duration of the primary control signal.

5. The flyback converter of claim 4, wherein the on-time duration is in a clock cycle of the primary control signal that is a preceding clock cycle ending when the primary control signal transitioned from the first state to the second state.

6. The flyback converter of claim 1, wherein the isolation stage includes an optocoupler configured to:
   receive the secondary control signal in the secondary side;
   convert the secondary control signal to the primary control signal; and
   output the primary control signal in the primary side.

7. The flyback converter of claim 1, wherein the secondary side control stage is configured to:
   generate a compensated error signal based at least in part on the output voltage and the reference voltage;
   compare the compensated error signal to a sawtooth signal; and
   cause the secondary control signal to be in the second state when the compensated error signal exceeds the sawtooth signal and cause the secondary control signal to be in the first state when the sawtooth signal exceeds the compensated error signal.

8. A controller, comprising:
   a secondary side control stage positioned in a secondary domain that is galvanically isolated from a primary domain and configured to:
   detect an output voltage of a converter;
   generate a secondary control signal, based at least in part on the output voltage and a reference voltage representing a desired output voltage of the converter, by at least:
      transitioning the secondary control signal from at least one of: a deasserted state to an asserted state and the asserted state to the deasserted state to indicate a time when the converter is to be driven;
      retaining the secondary control signal in at least one of the asserted state and the deasserted state for a duration of time commensurate with a desired current level of the converter; and
      outputting the secondary control signal for conversion to a primary control signal in the primary domain.

9. The controller of claim 8, further comprising:
   an isolation stage configured to receive the secondary control signal and convert the secondary control signal to the primary control signal by at least:

detecting that the secondary control signal transitioned from the at least one of the deasserted state to the asserted state and the asserted state to the deasserted state;

in response to detecting that the secondary control signal transitioned from the at least one of the deasserted state to the asserted state and the asserted state to the deasserted state, transitioning the primary control signal to at least one of the asserted state and the deasserted state; and retaining the primary control signal in the at least one of the asserted state and the deasserted state for a duration of time commensurate with the duration of time that the secondary control signal remains in the at least one of the asserted state and the deasserted state.

10. The controller of claim 8, further comprising:

a driving stage, operating in the primary domain, configured to:

detect that the primary control signal transitioned to the at least one of the asserted state and the deasserted state; and in response to detecting that the primary control signal transitioned to the at least one of the asserted state and the deasserted state, asserting or deasserting a driving signal for operating the converter.

11. The controller of claim 10, wherein the driving stage is configured to:

receive a current sense signal indicative of a current level of the converter;

detect the desired current level of the converter based at least in part on the primary control signal;

determining whether the current level of the converter has reached the desired current level of the converter;

in response to determining that the current level of the converter has reached the desired current level of the converter, asserting or deasserting the driving signal.

12. The controller of claim 11, wherein the driving stage is configured to detect the desired current level of the converter based on at least one of an on-time duration and an off-time duration of the primary control signal.

13. The controller of claim 12, wherein the on-time duration is in a clock cycle that is a preceding clock cycle ending when the primary control signal transitioned to the asserted state.

14. A method, comprising:

detecting an output voltage of a converter having primary and secondary windings that are galvanically isolated in respective primary and secondary sides;

generating, in the secondary side, a secondary control signal based at least in part on the output voltage and a reference voltage, generating the secondary control signal including:

causing the secondary control signal to transition from at least one of: a deasserted state to an asserted state and the asserted state to the deasserted state to indicate a time when the converter is to be powered; and retaining the secondary control signal in at least one of the asserted state and the deasserted state for a duration commensurate with a desired current of the primary winding;

converting the secondary control signal to a primary control signal provided in the primary side; and driving, in the primary side, the converter based at least in part on the primary control signal and a current sense signal indicative of a current flowing through the primary winding.

15. The method of claim 14, wherein generating the secondary control signal includes:

generating a plurality of control signals, wherein a first control signal of the plurality of control signals indicates the time when the converter is to be powered and a second control signal of the plurality of control signals indicates a desired current of the primary winding.

16. The method of claim 14, wherein generating the secondary control signal includes:

generating a plurality of control signals, wherein a first control signal of the plurality of control signals indicates the time when the converter is to be powered and a second control signal of the plurality of control signals indicates the a desired current of the primary winding.

* * * * *